United States Patent [19]
Casteel

[11] Patent Number: 4,733,864
[45] Date of Patent: Mar. 29, 1988

[54] PARLOR GAME

[76] Inventor: Ronald C. Casteel, 3336 Columbus Rd., Macon, Ga. 31204

[21] Appl. No.: 14,004

[22] Filed: Jan. 12, 1987

[51] Int. Cl.[4] ............................................. A63B 67/00
[52] U.S. Cl. ............................ 273/1 A; 273/DIG. 27
[58] Field of Search .............. 273/1 A, 286, DIG. 27; 434/250, 255

[56] References Cited

U.S. PATENT DOCUMENTS

| D. 172,987 | 9/1954 | Quigley | 273/1 A X |
| 3,008,718 | 11/1961 | Berliner | 273/286 X |
| 3,139,281 | 6/1964 | Nicholson | 273/1 A |
| 4,226,420 | 10/1980 | Corday | 273/DIG. 27 X |

FOREIGN PATENT DOCUMENTS

| 2329207 | 1/1975 | Fed. Rep. of Germany | 273/1 A |
| 1146527 | 3/1969 | United Kingdom | 273/DIG. 27 |

OTHER PUBLICATIONS

Spencer Gifts Catalog p. 23, Received in PTO 8-1-9-1972, 273-286.

Primary Examiner—William H. Grieb
Attorney, Agent, or Firm—Diller, Ramik & Wight

[57] ABSTRACT

A parlor game in which the "board" is an indoor/outdoor carpet formed of a lower backing sheet or ply and an upper V-lock fiber sheet or ply defined by a plurality of generally parallel ridges and upwardly opening grooves, flock being applied to the upper surface to form bordered game areas and/or numerals therein, and the flock areas being of a vivid color and texture readily distinguishable from the color and texture of the fiber carpet whereby these areas are readily distinguishable by sight-impaired and/or blind individuals to permit the latter to play the game within the parameters thereof.

15 Claims, 3 Drawing Figures

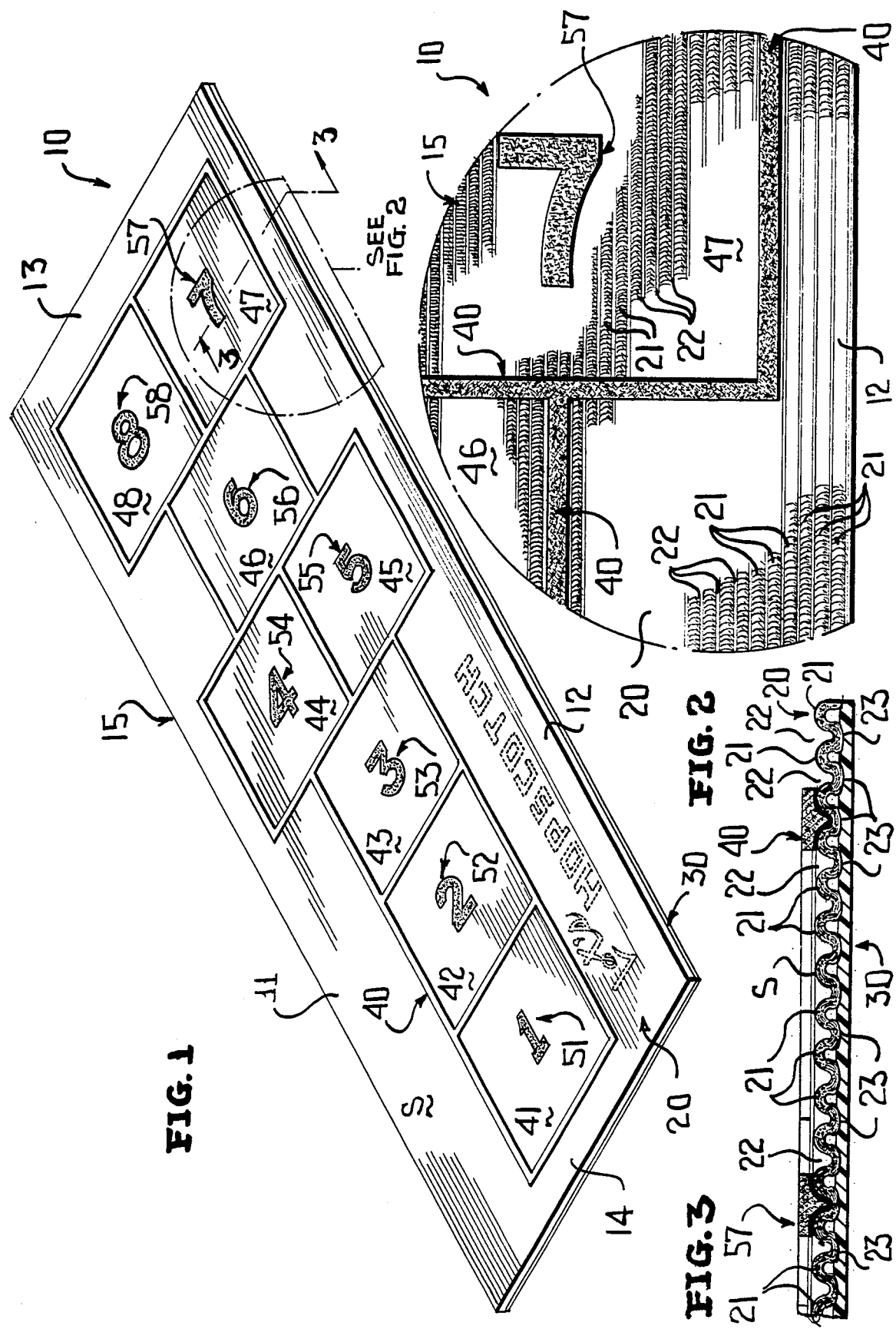

PARLOR GAME

BACKGROUND OF THE INVENTION

This invention is directed to a novel parlor game which is portable, transportable, safe when used by small children, capable of being roller from a generally flat uni-planar playing position to a generally roller tubular transporting and storing position, and is particularly constructed to be used by sight-impaired or blind persons. Typically the parlor game is exemplified in the preferred embodiment of the invention by the game of Hopscotch in which numbered blocks are drawn on a surface, and a playing piece (stone or small disc) is thrown upon and retrieved from successively numbered areas by a person generally hopping on one and/or two feet and at times avoiding certain areas upon which another competitor's playing piece rests.

The game of Hopscotch, along with many other "old" games, has begun to fade from memory and use, particularly with the advent of sophisticated electronic games. However, most commercially available games requires a high degree of manual dexterity, good eyesight, good coordination, and, of course, do little for overall physical activity. Furthermore, most modern games utilizing electronics are of little value to individuals, particularly young children, who have poor eyesight, are sight-impaired, blind, or lack physical coordination, either because of youth or physical/mental impairment. Thus, the present invention is directed to a parlor game which can be played by all individuals, young and old alike, virtually without exception irrespective of anything other than the most severe mental/physical handicaps.

SUMMARY OF THE INVENTION

The present invention is directed to a novel parlor game which essentially includes a flexible carpet that can be readily rolled and unrolled so that when rolled it can be transported or stored and when unrolled to a flat uniplanar condition, the carpet functions generally as a game "board". The carpet has a peripheral outline and a top face, and an upper surface of the latter is defined by a mass of carpet fibers having one or both of a predetermined first relatively vivid color or texture. The vivid color is selected so as to be highly discernible by sight-impaired or poor sighted individuals, whereas the carpet texture can be any one of "hard", "soft", "ridged", etc. Flock or flock fibers are then bonded to the carpet upper surface to delineate both a plurality of first areas of a first predetermined configuration into which playing pieces can be tossed and individuals can move and second areas of second predetermined different configurations within the first areas. The second areas could be as in the case of Hopscotch, numbers within generally rectangular or square first areas. Significantly the invention provides that the first and second flock fibers or flock areas are either or both different in color and texture from the overall carpet fibers. Thus, if the distinguishing characteristic is one of only color, a sight-impaired or poor sighted person can readily see the differences, whereas if the distinguishing characteristics between the carpet fibers and the areas is one of texture, a blind person, through touch/feel manipulation, can equally utilize the parlor game. Obviously, the preferred aspects of the invention include both color and fiber texture characteristics which are highly distinguishable so that the parlor game is utilized by all people, but particularly by sight-imparted or blind individuals.

With the above and other objects in view that will hereinafter appear, the nature of the invention will be more clearly understood by reference to the following detailed description, the appended claims and the several views illustrated in the accompanying drawing.

BRIEF DESCRIPTION OF THE DRAWING

FIG. 1 is a top perspective view of a novel parlor game constructed in accordance with this invention, and illustrates a carpet having flock upon carpet fibers delineating game areas and numerical identifications of each area, as exemplified by the game of Hopscotch.

FIG. 2 is a highly enlarged top plan view of the encircled portion of FIG. 1, and illustrates a plurality of generally parallel grooves and ridges of the carpet fibers and the flock bonded thereto.

FIG. 3 is an enlarged cross-sectional view taken generally along line 3—3 of FIG. 1, and illustrates in detail the manner in which the flock is bonded upon and within the respective ridges and slots or grooves of the carpet fibers and a backing member of the latter.

DESCRIPTION OF THE PREFERRED EMBODIMENT

A novel parlor game constructed in accordance with this invention is generally designated by the reference numeral 10, and is particularly adapted to be readily portable, transportable, safe when in use, capable of being rolled from a generally flat uni-planar position (FIG. 1) to a generally rolled tubular transporting and storing position (not shown), and particularly adapted for use by sight-impaired, blind, young and/or relatively uncoordinated individuals, particularly though not necessarily children.

The parlor game is generally designated by the reference numeral 10, and is defined by a carpet 15 of a predetermined polygonal outline which is set-off by opposite longitudinal generally parallel edges 11, 12, and opposite generally transverse parallel edges 13, 14.

The carpet 15 includes an upper member, ply, sheet 20 in the form of conventional V-lock carpet fibers and a lower backing member, ply, or sheet 30 formed of rubber, plastic or weatherproof material. Preferably, the carpet 15 is so-called indoor/outdoor carpet which is highly resistance to adverse atmospheric conditions, particularly dampness, and to the latter end the V-lock fiber 20 is preferably polyethylene.

The V-lock carpet fibers or carpet fibers 20 are shown constructed as an undulating series of generally parallel ridges 21 and upwardly opening V-shaped valleys, grooves or slots 22 (FIG. 3). The grooves or slots 22 and the ridges 21 are not only parallel to each other but parallel the longitudinal edges 11, 12, as is most readily apparent from FIG. 2. Each upwardly opening V-shaped groove 22 is defined by a corresponding lower ridge 23 (FIG. 3), and the lower ridges 23 are bonded/united to the rubber-backed or adhesive plastic backing, ply or sheet 30 which maintains the ridges 21, 23 and the associated upwardly opening V-shaped grooves 22 in the generally parallel configuration best illustrated in FIG. 3. A planar upper surface S is shown in FIG. 3 and essentially defines the uppermost surface of the carpet 15 and specifically the carpet fibers 20 thereof when the carpet 15 is in its uni-planar playing position.

First flock means or flock fibers 40 and second flock means or flock fibers 51 through 58 are bonded generally to the upper surface S of the overall carpet 15, and particularly to the ridges 21 (FIG. 3) and in the V-shaped grooves 22.

The flock or flock fibers 40 delineate, bound or set-off generally rectangular areas 41 through 48 (FIG. 1) which respectively bound the second flock fibers or areas 51 through 58 which are respectively contoured to the numbers "1" through "8", respectively. The flock, flock fibers or flock means 40, and 51–58 are distinguishable from the carpet fiber ply 20 in two significant characteristics, namely, color and texture, though a third characteristic, planar displacement, is also important.

Considering first the color and texture of the fiber ply 20, the fibers thereof are preferably polypropylene which are looped or needled to form the ridges 21, 23. The texture of polypropylene is relatively slick or slippery, yet when touched the grooves 22 are readily distinguishable from the ridges 21. Thus, the texture of the carpet ply 20 is smooth yet longitudinally grooved, slotted or corrugated due to the alternating pattern of the upwardly opening grooves 22 and the adjoining ridges 21. Thus, this texture can be readily distinguished when touched by a blind person, simply because of its relatively smooth, yet longitudinally corrugated, grooved or rippled configuration. Furthermore, the carpet fibers 20 are preferably of a color highly perceptible by poor sighted or sight-impaired people.

The flock fibers 40 and 51 through 58 are short nylon fibers which are drawn by suction from below and pressure above, as viewed in FIG. 3, into intimate contact with the ridges 21 and within the valleys 22 and are heat-bonded thereto. Due to the upwardly converging cross-sectional configuration of the grooves 22, the flock fibers 40, 51 through 58 are virtually "locked" into the grooves 22 precluding the flock fibers from being torn or ripped from the fiber mat 20 through use and/or abuse of the parlor game 10.

The flock or flock means 40 and 51 through 58 are likewise distinguishable, preferably both in color and texture from that of the carpet fiber 20, and to the latter end the color of the flock means 40 and 51 through 18 is as distinguishable as possible, and in a commercial embodiment of the present invention, the carpet fibers 20 are a vivid green and the floss fibers 40 and 51 through 58 are a vivid red, although any distinguishing colors are applicable to the present invention. Furthermore, the fibers of the flock means 41 and 51 through 58 are preferably nylon and uppermost ends (unnumbered) of the fibers which are most remote from and project upwardly of the surface S are highly compacted or tight, and the texture or "feel" when touched is that of a tight nylon bristled brush, most typical of which is flock brushes used for clothing lint removal. Thus, the bristle-brushed texture of the flock fibers 40 and 51 through 58 presents a rougher (and ungrooved) texture to the touch than the smoother grooved or ridged texture of the fiber mat 20. Accordingly, a blind person in particular can readily distinguish by touch the flock areas 40 and 51 through 58 from the fiber mat 20 and in this manner can readily determine whether a playing piece has been positioned totally within the correct area 41 through 48. Obviously, the shape of the areas 51 through 58 readily provides an indication of the exact area in which the playing piece rests. Hence, because of the highly distinguishable color and texture characteristics of the fiber carpet 20 relative to the flock areas 40 and 51 through 58, both poor sighted, sight-impaired and/or blind individuals can readily utilize the present parlor game. Obviously, the built-in safety of the soft overall carpet texture is highly desirable should persons, particularly small children or uncoordinated individuals, fall during the play of the game.

In further accordance with this invention, it will be noted that all of the flock means 40 and 51 through 58 are raised relative to the upper surface S of the carpet fiber ply 20, and this relatively planar displacement also permits particularly a blind person to readily distinguish the flock or flock means 40 and 51 through 58 from the remainder of the carpet, particularly the fiber ply 20. However, in further accordance with this invention the upper surface (unnumbered) of the flock fibers or flock fiber areas 40 and 51 through 58 can be coplanar to the surface S or recessed therebelow. In the letter case, the recess provided additional tactile distinguishment of the areas 40 and 51 through 58 from the remainder of the carpet 15, but even when the ends of the fibers of the flocks 41 and 51 through 58 are coplanar with the ridges 21 on the surface S, the areas are distinguishable because of the texture difference of the fibers 20, the ridges 21 and the grooves 22 on the one hand and the flock fibers 40 and 51 through 58 on the other hand. Thus, preferably the major differences of color and texture facilitate the advantageous use of the parlor game 10 for poor sighted, blind young and/or uncoordinated individuals, and the latter is also augmented by the planar displacement (above or below) of the flock areas 41 and 51 through 58 relative to the remaining unflocked, grooved/ridges V-locked fibers 20.

It is also to be particularly noted that the carpet 15 is not "bound" in a conventional manner at its longitudinal edges 11, 12 or its transverse edges 13, 14, thus maintaining cost lower than for "bound" carpet yet unraveling is precluded by the adhesive bonding of the lower ply face 30 to the ridges 23.

Although a preferred embodiment of the invention has been specifically illustrated and described herein, it is to be understood that minor variations may be made in the apparatus without departing from the spirit and scope of the invention, as defined in the appended claims.

I claim:

1. A parlor game which is readily portable, transportable, safe and capable of being roller from a generally flat uni-planar playing position to a generally roller tubular transporting and storing position and is particularly adapted for use by sight-impaired or blind individuals comprising a generally flexible carpet of a predetermined peripheral outline, said carpet having top and bottom faces, said top face being defined by a mass of carpet fibers over the entire area defined by said peripheral outline, said carpet fibers being one of a first predetermined relatively vivid color and texture particularly discernible by respective sight-impaired and blind individuals, said carpet fibers generally defining an upper surface of said carpet, first flock means upon said carpet upper surface for delineating a plurality of first areas of a first predetermined configuration between which individuals can move within the particular parameters of the associated parlor game, second flock means upon said carpet upper surface for delineating a plurality of second areas of second predetermined different configurations within at least a plurality of said first areas, and said first and second flock means being one of a second predetermined relatively vivid color and texture readily distinguishable by at least one of color and texture from said carpet fibers whereby said first and second areas are readily distinguishable from each other by sight-impaired and blind individuals.

2. The parlor game as defined in claim 1 wherein said carpet fibers and said first and second flock means differ only in color.

3. The parlor game as defined in claim 1 wherein said carpet fibers and said first and second flock means differ only in fiber texture.

4. The parlor game as defined in claim 1 wherein said carpet fibers and said first and second flock means differ both in color and fiber texture.

5. The parlor game as defined in claim 1 wherein at least one of said first and second means is raised above said carpet upper surface.

6. The parlor game as defined in claim 1 wherein at least one of said first and second flock means is recessed below said carpet upper surface.

7. The parlor game as defined in claim 1 wherein said first and second flock means are each raised above said carpet upper surface.

8. The parlor game as defined in claim 1 wherein both of said first and second flock means are each recessed below said carpet upper surface.

9. The parlor game as defined in claim 1 wherein said carpet top face includes a plurality of upwardly opening slots narrowing in a direction toward said carpet upper surface, at least one of said first and second flock means being disposed within said slots, and means bonding said at least one of said first and second flock means in said slots.

10. The parlor game as defined in claim 4 wherein at least one of said first and second flock means is raised above said carpet upper surface.

11. The parlor game as defined in claim 4 wherein at least one of said first and second flock means is recessed below said carpet upper surface.

12. The parlor game as defined in claim 10 wherein said carpet top face includes a plurality of upwardly opening slots narrowing in a direction toward said carpet upper surface, at least one of said first and second flock means being disposed within said slots, and means bonding said at least one of said first and second flock means in said slots.

13. The parlor game as defined in claim 11 wherein said carpet top face includes a plurality of upwardly opening slots narrowing in a direction toward said carpet upper surface, at least one of said first and second flock means being disposed within said slots, and means bonding said at least one of said first and second flock means in said slots.

14. The parlor game as defined in claim 12 wherein said first and second flock means are each raised above said carpet upper surface.

15. The parlor game as defined in claim 13 wherein both of said first and second flock means are each recessed below said carpet upper surface.

* * * * *